Sept. 25, 1923.

C. C. WESTERMAN

SELF FEEDER FOR STOCK

Filed Oct. 24, 1922

1,469,129

C. C. Westerman  Inventor

By C. A. Snow & Co.
Attorney

Patented Sept. 25, 1923.

1,469,129

UNITED STATES PATENT OFFICE.

CLAUDE C. WESTERMAN, OF BREMEN, OHIO, ASSIGNOR OF ONE-HALF TO G. L. WESTERMAN, OF BREMEN, OHIO.

SELF-FEEDER FOR STOCK.

Application filed October 24, 1922. Serial No. 596,566.

*To all whom it may concern:*

Be it known that I, CLAUDE C. WESTERMAN, a citizen of the United States, residing at Bremen, in the county of Fairfield and State of Ohio, have invented a new and useful Self-Feeder for Stock, of which the following is a specification.

This invention relates to stock feeders and more particularly to self feeders for hogs.

The object of the invention is to provide a feeder of this character so constructed as to eliminate waste, to economize in floor space and time of the attendant, and permit the stock to eat at will.

Another object is to so construct a feeder of this character that the animals may feed themselves by manipulating parts of the apparatus with their noses which causes the feed to flow into the trough.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 2:
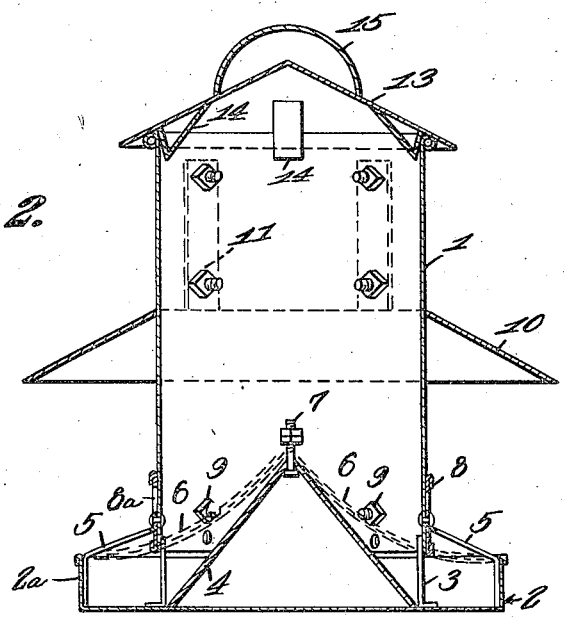
Fig. 2 is a longitudinal vertical section thereof.
Figure 3:
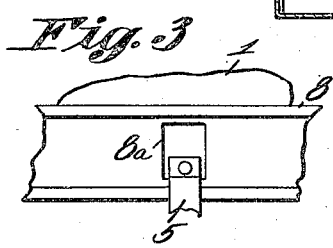
Fig. 3 is a detail front elevation.

In the embodiment illustrated the feeder constituting this invention comprises a container 1 in the form of a hopper which may be constructed of any suitable material, preferably of sheet metal and which may be of any desired size according to the quantity of feed to be held. This hopper as shown is cylindrical in form and is mounted in a trough like bottom 2 having an upstanding peripheral flange $2^a$. This trough 2 extends radially beyond the hopper 1 the lower end of the hopper being supported by means of brackets 3 secured to the bottom of the trough 2 as is shown clearly in Fig. 2.

A cone-shaped feed spreader 4 projects upwardly into the lower end of the hopper 1 from the bottom of the trough 2 and has a bolt 7 extending through the apex thereof. A plurality of flexible elements here shown in the form of chains 6 are secured at one end to the bolt 7 and at their other ends to the upper edge of the flange $2^a$ at circumferentially spaced intervals.

Figure 1:
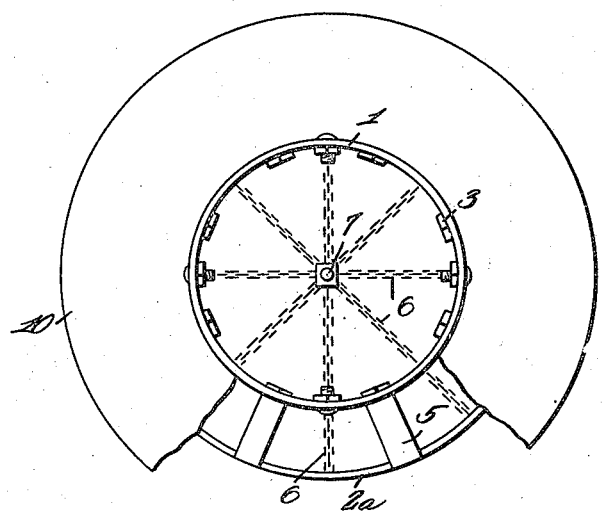
Fig. 1 represents a plan view with parts broken out of the feeder constituting this invention, the top being removed to disclose the interior.

A plurality of spaced cross bars 5 connect the lower end of the hopper 1 with the flange $2^a$ and operate to prevent the hogs or other animals from rooting out the feed, thus avoiding waste. These cross bars 5 are arranged to alternate with the chains 6 as is shown clearly in Fig. 1. These chains 6 are designed to be moved by the noses of the animals feeding from the trough which will loosen and shake down the feed from the hopper.

An adjusting ring or band 8 is mounted on the lower end of the hopper 1 and is designed to be moved up or down to vary the space between the bottom of the trough and the lower end of the hopper to adapt ear corn or shelled corn to be fed at the will of the user. This band 8 is secured in adjusted position on the hopper by means of screws or bolts 9, the hopper and the ring having spaced registering apertures to receive the bolts according to the position in which the band is to be located. This band 8 is also provided with transversely extending openings $8^a$ through which the cross bars 5 extend and which permit the band to be adjusted in the manner above described.

A rain shield 10 is mounted on the hopper 1 above the trough 2 and is held adjustably thereon by means of straps or supporting strips 11 which are equipped with a plurality of spaced apertures which are designed to register with cooperating apertures in the hopper 1 so that the shield may be moved up or down to position it toward or away from the trough according to the protection desired to be afforded the contents of the trough. This shield 10 is inclined downwardly and outwardly as shown clearly in Fig. 2 and projects radially into a plane some distance beyond that of the trough so that the water shed thereby will not enter the trough.

When the feeder is to be used outside a dome-shaped lid 13 is provided and which is equipped on its inner face with a plurality of depending brackets 14 designed to engage the inner face of the hopper 1 to hold the lid in operative position. This lid 13 extends beyond the outer face of the hopper 1 to avoid rain driving in around the edges thereof. A handle 15 is provided for manipulating the top and as shown extends transversely across the apex thereof.

This self feeder while primarily designed for feeding hogs may be used for feeding sheep or cattle, it of course being understood that when it is used for larger animals the size of the trough will be increased and the rain shield raised to permit the heads of the animals to be freely inserted under it.

I claim:

1. In a feeder of the class described a hopper, a trough arranged below and spaced from said hopper, a cone-shaped spreader carried by said trough and extending into said hopper, means for varying the space between the hopper and the trough, and a plurality of chains secured at one end to the apex of said spreader and at their other ends to the outer wall of the trough.

2. In a feeder of the class described a cylindrical hopper, an annular trough arranged below said hopper and projecting radially beyond the walls thereof, supports for the hopper carried by the trough, a cone-shaped spreader mounted in the trough with its apex extending into the hopper, cross bars connecting the lower end of the hopper and the trough at intervals, and chains arranged to alternate with said cross bars and connected at one end with the trough and at their other end with apex of the spreader whereby the animal feeding may manipulate the chains to shake down feed from the hopper into the trough.

In testimony that I claim the foregoing as my own, I have hereto affixed my signature in the presence of two witnesses.

CLAUDE C. WESTERMAN.

Witnesses:
E. T. PURVIS,
MARY HOCKMAN.